United States Patent
Nicholas

(10) Patent No.: US 12,116,998 B2
(45) Date of Patent: Oct. 15, 2024

(54) FLEXIBLE SPINNING SCROLL COUPLING DEVICE

(71) Applicant: Air Squared, Inc., Thornton, CO (US)

(72) Inventor: Nathan D. Nicholas, Westminster, CO (US)

(73) Assignee: Air Squared, Inc., Thornton, CO (US)

( * ) Notice: Subject to any disclaimer, the term of this patent is extended or adjusted under 35 U.S.C. 154(b) by 0 days.

(21) Appl. No.: 18/143,773

(22) Filed: May 5, 2023

(65) Prior Publication Data

US 2023/0358229 A1    Nov. 9, 2023

Related U.S. Application Data

(60) Provisional application No. 63/339,731, filed on May 9, 2022.

(51) Int. Cl.
*F04C 2/02* (2006.01)
*F04C 15/00* (2006.01)
(Continued)

(52) U.S. Cl.
CPC .......... *F04C 15/0061* (2013.01); *F04C 2/025* (2013.01); *F04C 18/0207* (2013.01); *F04C 29/0057* (2013.01); *F16D 3/005* (2013.01); *F16D 3/12* (2013.01); *F16D 3/14* (2013.01); *F04C 23/008* (2013.01)

(58) Field of Classification Search
CPC .. F04C 2/025; F04C 15/0061; F04C 18/0207; F04C 18/023; F04C 23/008; F04C 29/0057; F01C 1/0207; F01C 1/023; F01C 17/06; F01C 17/066; F16D 3/005; F16D 3/04; F16D 3/78
See application file for complete search history.

(56) References Cited

U.S. PATENT DOCUMENTS

| 4,282,723 A | | 8/1981 | Schmidt | |
|---|---|---|---|---|
| 4,317,339 A | * | 3/1982 | Schmidt | F16D 3/78 464/98 |

(Continued)

FOREIGN PATENT DOCUMENTS

EP    2500595    9/2012

OTHER PUBLICATIONS

EP2500595A1—Fink et al.—Shaft Coupling—Sep. 19, 2012—English machine Translation. (Year: 2012).*

(Continued)

*Primary Examiner* — Theresa Trieu
(74) *Attorney, Agent, or Firm* — Sheridan Ross P.C.

(57) ABSTRACT

A flexible coupling device for a spinning or co-rotating scroll device and associated systems and methods are provided. The coupling device may be configured to couple a first scroll and a second scroll of a co-rotating scroll device. Further, a first scroll shaft of the first scroll and a second scroll shaft of the second scroll are maintained in parallel misalignment by the coupling device. The coupling device may comprise a coupling ring and a plurality of connecting members extending from the coupling ring. Each connecting member includes a flexure arm configured to elastically move or flex between a first flexed position and a second flexed position which contributes to maintaining the parallel misalignment between the first scroll shaft and the second scroll shaft.

20 Claims, 11 Drawing Sheets

(51) Int. Cl.
  *F04C 18/02* (2006.01)
  *F04C 29/00* (2006.01)
  *F16D 3/00* (2006.01)
  *F16D 3/12* (2006.01)
  *F16D 3/14* (2006.01)
  *F04C 23/00* (2006.01)

(56) References Cited

U.S. PATENT DOCUMENTS

| | | | |
|---|---|---|---|
| 4,371,323 A * | 2/1983 | Fischer | F01C 17/00 |
| | | | 418/55.3 |
| 5,037,280 A | 8/1991 | Nishida et al. | |
| 7,976,294 B2 | 7/2011 | Yanakisawa | |
| 8,007,260 B2 | 8/2011 | Yanakisawa | |
| 9,097,252 B2 | 8/2015 | Schofield et al. | |
| 2013/0039791 A1 * | 2/2013 | Schofield | F04C 18/0215 |
| | | | 418/55.3 |

OTHER PUBLICATIONS

Extended Search Report for European Patent Application No. 23172184.6, dated Sep. 25, 2023 8 pages.

\* cited by examiner

FLEXIBLE SPINNING SCROLL COUPLING DEVICE

CROSS-REFERENCE TO RELATED APPLICATIONS

The present application claims the benefit of and priority to U.S. Provisional Application Ser. No. 63/339,731, filed on May 9, 2022, entitled "Flexible Spinning Scroll Coupling Device", the entire disclosure of which is hereby incorporated herein by reference, in its entirety, for all that it teaches and for all purposes.

FIELD

The present disclosure generally relates to spinning scroll devices, and relates more particularly to co-rotating spinning scroll devices.

BACKGROUND

Conventional scroll devices typically use an orbiting type motion between a fixed scroll and a stationary scroll to compress or expand a working fluid. Other scroll devices include co-rotating or spinning scroll devices. Co-rotating scroll devices use parallel misaligned scroll shafts that are coupled to each other. Conventional devices may couple the scroll shafts by using metal bellows that are disposed between two scrolls to transmit torque, using two individual servo motors (one motor for each shaft) with precision devices that ensure co-rotation of one scroll shalt relative to another scroll shaft; a belt coupling design where both scroll shafts are driven via two separate timing belts that are connected to a third shaft equidistant from the scroll shafts; and/or a gear-driven design where two sets of gear connect the scroll shafts to a third timing shaft equidistant from the scroll shafts.

SUMMARY

The techniques of this disclosure generally relate to spinning or co-rotating scroll devices.

A flexible coupling device for a co-rotating scroll device according to at least one embodiment of the present disclosure comprises a coupling ring comprising an inner diameter and an outer diameter, the outer diameter defining a periphery of the coupling ring; and a plurality of connecting members interconnected to the outer diameter of the coupling ring, the plurality of connecting members each having a protruding member extending radially outward from the periphery of the coupling ring in a direction away from a center of the coupling ring, wherein each protruding member extends from a connection point at the outer diameter of the coupling ring to a hinge point offset from the outer diameter of the coupling ring, wherein each connecting member of the plurality of connecting members comprises a flexure arm interconnected to the protruding member at the hinge point and extending from the hinge point, at a nonzero angle, to a flexure end point, wherein the flexure arm is configured to elastically move between a first flexed position and a second flexed position, wherein, in the first flexed position, the flexure end point is arranged a first distance from the outer diameter of the coupling ring, wherein, in the second flexed position, the flexure end point is arranged a second distance from the outer diameter of the coupling ring, and wherein the second distance is greater than the first distance.

Any of the aspects herein, wherein the plurality of connecting members are arranged circumferentially equidistant from one another around the periphery of the coupling ring.

Any of the aspects herein, wherein a first set of connecting members of the plurality of connecting members is configured to interconnect with a first scroll of the co-rotating scroll device, and wherein a second set of connecting members of the plurality of connecting members is configured to interconnect with a second scroll of the co-rotating scroll device.

Any of the aspects herein, wherein the first set of connecting members comprises every other connecting member of the plurality of connecting members around the periphery of the coupling ring, and wherein the second set of connecting members comprises connecting members of the plurality of connecting members disposed between adjacent connecting members of the first set of connecting members around the periphery of the coupling ring.

Any of the aspects herein, wherein each connecting member of the plurality of connecting members comprises a receiver extending from the flexure arm, the receiver configured to receive a pin of at least one of a first scroll or a second scroll of the co-rotating scroll device.

Any of the aspects herein, wherein the receiver comprises a ring and an aperture to receive a pin of at least one of a first scroll or a second scroll of the co-rotating scroll device.

Any of the aspects herein, wherein the coupling ring and the plurality of connecting members are formed from a same material.

Any of the aspects herein, wherein the coupling ring and the plurality of connecting members are formed from different materials.

A co-rotating scroll device according to at least one embodiment of the present disclosure comprises a first scroll having a first plate, a first involute extending from the first plate, and a first scroll shaft connected to the first plate; a second scroll having a second plate, a second involute extending from the second plate, and a second scroll shaft connected to the first plate, wherein the first involute and the second involute are nested and wherein the first scroll shaft and the second scroll shaft are parallel and misaligned; and a coupling device configured to couple the first scroll and the second scroll and comprising a coupling ring and a plurality of connecting members extending from the coupling ring.

Any of the aspects herein, wherein a first set of connecting members of the plurality of connecting members is configured to interconnect with a first scroll of the co-rotating scroll device, and wherein a second set of connecting members of the plurality of connecting members is configured to interconnect with a second scroll of the co-rotating scroll device.

Any of the aspects herein, wherein the first set of connecting members comprises every other connecting member of the plurality of connecting members around a periphery of the coupling ring, and wherein the second set of connecting members comprises connecting members of the plurality of connecting members disposed between adjacent connecting members of the first set of connecting members around the periphery of the coupling ring.

Any of the aspects herein, further comprising a motor configured to drive the first scroll, wherein the second scroll is driven by the first scroll via the coupling device.

Any of the aspects herein, wherein the plurality of connecting members each have a protruding member extending radially outward from the coupling ring in a direction away from a center of the coupling ring.

Any of the aspects herein, wherein each protruding member extends from a connection point of the coupling ring to a hinge point offset from an outer diameter of the coupling ring.

Any of the aspects herein, wherein the plurality of connecting members each comprise a flexure arm interconnected to the protruding member at the hinge point and extends from the hinge point, at a nonzero angle, to a flexure end point, wherein the flexure arm is configured to elastically move between a first flexed position and a second flexed position, wherein, in the first flexed position, the flexure end point is arranged a first distance from the outer diameter of the coupling ring, wherein, in the second flexed position, the flexure end point is arranged a second distance from the outer diameter of the coupling ring, and wherein the second distance is greater than the first distance.

Any of the aspects herein, wherein each connecting member of the plurality of connecting members comprises a receiver extending from the flexure arm, the receiver configured to receive a pin of at least one of a first scroll or a second scroll of the co-rotating scroll device.

Any of the aspects herein, wherein the receiver comprises a ring and an aperture to receive a pin of at least one of a first scroll or a second scroll of the co-rotating scroll device.

Any of the aspects herein, wherein the coupling ring and the plurality of connecting members are formed from a same material.

Any of the aspects herein, wherein the coupling ring and the plurality of connecting members are formed from different materials.

A co-rotating scroll device according to at least one embodiment of the present disclosure comprises a first scroll having a first plate, a first involute extending from the first plate, and a first scroll shaft connected to the first plate; a second scroll having a second plate, a second involute extending from the second plate, and a second scroll shaft connected to the first plate, wherein the first involute and the second involute are nested and wherein the first scroll shaft and the second scroll shaft are parallel and misaligned; and a coupling device configured to couple the first scroll and the second scroll, the coupling device comprising: a coupling ring comprising an inner diameter and an outer diameter, the outer diameter defining a periphery of the coupling ring; and a plurality of connecting members interconnected to the outer diameter of the coupling ring, the plurality of connecting members each having a protruding member extending radially outward from the periphery of the coupling ring in a direction away from a center of the coupling ring, wherein each protruding member extends from a connection point at the outer diameter of the coupling ring to a hinge point offset from the outer diameter of the coupling ring, wherein each connecting member of the plurality of connecting members comprises a flexure arm interconnected to the protruding member at the hinge point and extending from the hinge point, at a nonzero angle, to a flexure end point, wherein the flexure arm is configured to elastically move between a first flexed position and a second flexed position, wherein, in the first flexed position, the flexure end point is arranged a first distance from the outer diameter of the coupling ring, wherein, in the second flexed position, the flexure end point is arranged a second distance from the outer diameter of the coupling ring, and wherein the second distance is greater than the first distance.

The details of one or more aspects of the disclosure are set forth in the accompanying drawings and the description below. Other features, objects, and advantages of the techniques described in this disclosure will be apparent from the description and drawings, and from the claims.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages of the present disclosure will become apparent to those skilled in the art upon consideration of the embodiment descriptions provided hereinbelow.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Figure 1:
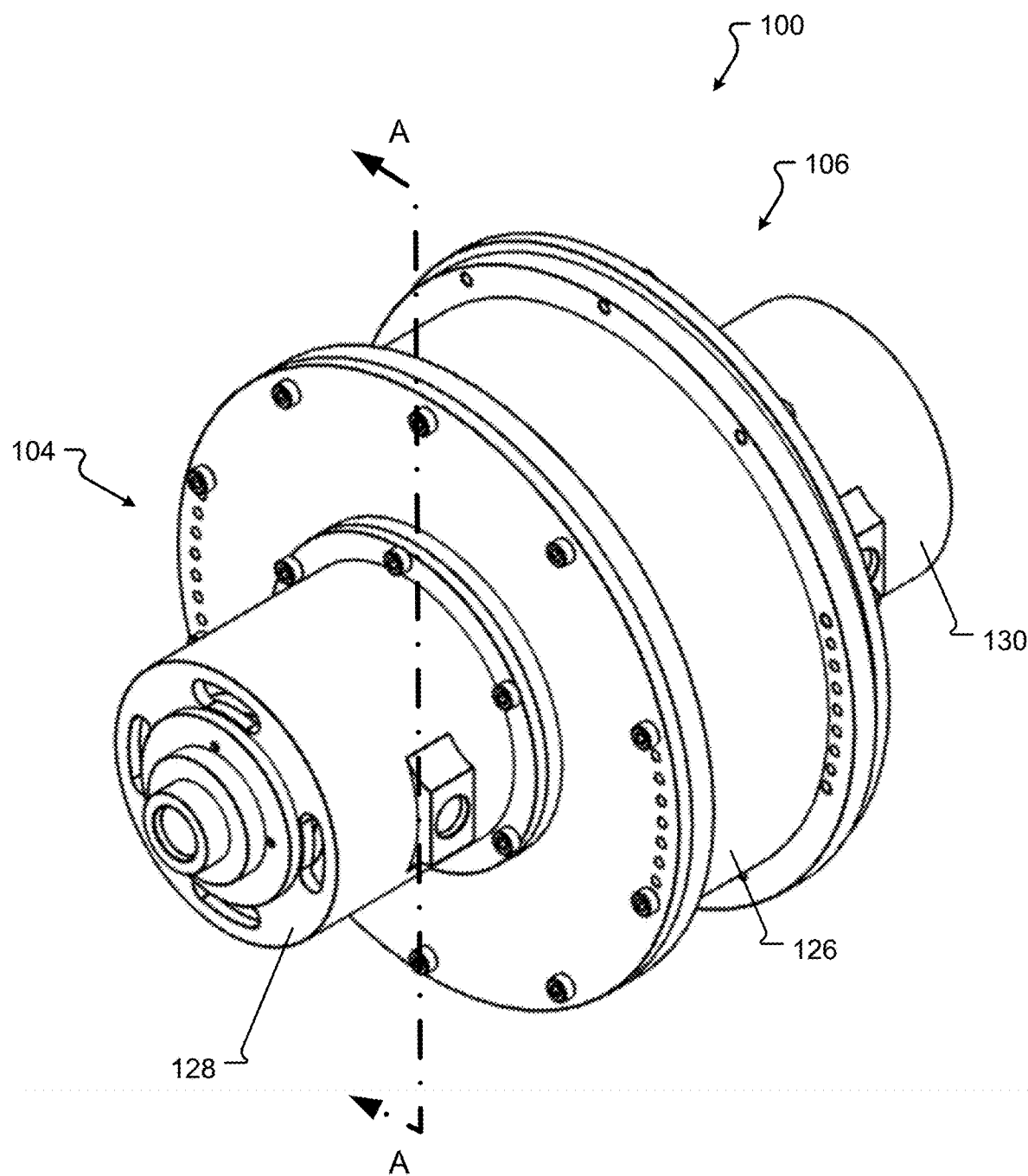
FIG. 1 is a perspective view of a scroll device according to at least one embodiment of the present disclosure.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a co-rotating scroll device.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The use of "substantially" in the present disclosure, when referring to a measurable quantity (e.g., a diameter or other distance) and used for purposes of comparison, is intended to mean within 5% of the comparative quantity. The terms "substantially similar to," "substantially the same as," and "substantially equal to," as used herein, should be interpreted as if explicitly reciting and encompassing the special case in which the items of comparison are "similar to," "the same as" and "equal to," respectively.

Figure 2:
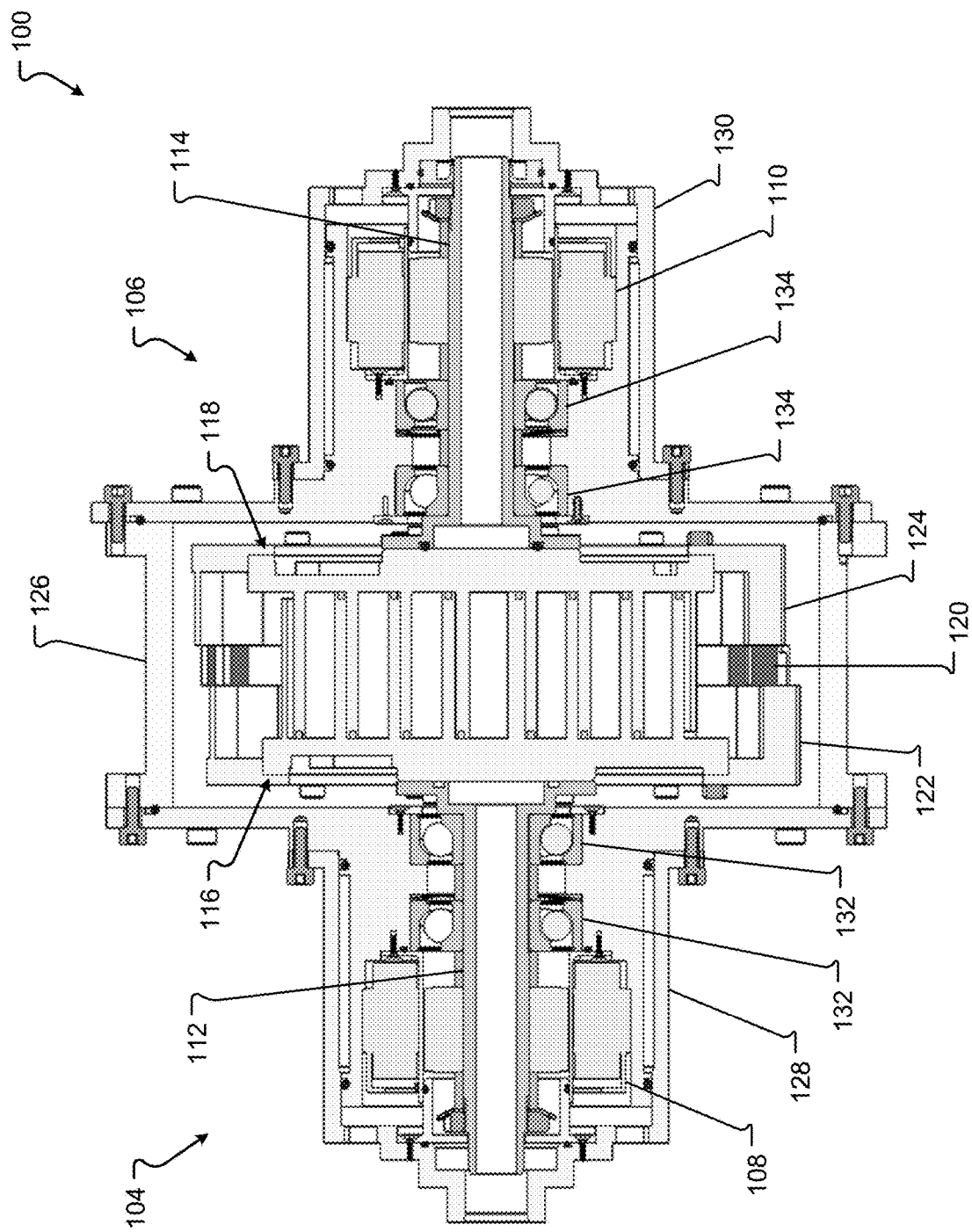
FIG. 2 is a cross-sectional side elevation view of the scroll device of FIG. 1 taken along line A-A of FIG. 1 according to at least one embodiment of the present disclosure.

FIG. 1 illustrates a perspective view of a scroll device 100 and FIG. 2 illustrates a cross-sectional side elevation view of the scroll device 100 taken along line A-A of FIG. 1 according to at least one embodiment of the present disclosure. The scroll device 100 is operable to receive a working fluid and either compress the working fluid (e.g., a scroll compressor) or expand the working fluid (e.g., a scroll expander). The scroll device 100 may be a co-rotating or spinning scroll device 100 in which both scrolls of the scroll device 100 are rotating (as opposed to, for example, an orbiting scroll in which one scroll is fixed and another scroll orbits relative to the fixed scroll).

The scroll device 100 includes a scroll assembly 102 (although visible in the section view of FIG. 2, the scroll assembly 102 is shown separately at least in FIGS. 3-6) having a first scroll side 104 and a second scroll side 106. The first scroll side 104 includes a first motor 108 that drives or rotates a first scroll shaft 112 connected to a first scroll 116 and the second scroll side 106 includes a second motor 110 that drives or rotates a second scroll shaft 114 connected a second scroll 118. It will be appreciated that though two motors are shown, the scroll device 100 may only include or utilize one motor to drive the first scroll 116 (e.g., the drive scroll). In this single-motor configuration, the rotation of the first scroll 116 rotates the second scroll 118 (e.g., the driven scroll) and the coupling device 120 enables the first scroll shaft 112 and the second scroll shaft 114 to maintain synchronicity with one another, maintain parallel misalignment during such rotation, and ensure co-rotation between the first scroll 116 and the second scroll 118.

The first scroll 116 includes a first involute 122 and the second scroll 118 includes a second involute 124 that is nested in, or engaged with, the first involute 122. In the case of a scroll compressor, the working fluid moves from a periphery (e.g., an inlet) of the first involute 122 and the second involute 124 towards the center (e.g., a discharge port, or outlet, etc.) of the first involute 122 and the second involute 124 through increasingly smaller pockets, generating compression of the working fluid. Similar principles apply for a scroll vacuum pump and/or a scroll expander configuration.

The scroll assembly 102 is contained within a housing 126 that houses the first scroll 116 and the second scroll 118, a first motor housing 128 housing the first motor 108, and a second motor housing 130 housing the second motor 110. The first scroll side 104 may also include one or more first scroll bearings 132 to support the first scroll shaft 112 and the second scroll side 106 may also include one or more second scroll bearings 134 to support the second scroll shaft 114. As illustrated, the one or more first scroll bearings 132 includes two scroll bearings 132 adjacent to the first motor 108 and the one or more second scroll bearings 134 includes two scroll bearings 134 adjacent to the second motor 110. Though it will be appreciated that the one or more first scroll bearings 132 and the one or more second scroll bearings 134 can include any number of bearings positioned anywhere within the scroll device 100.

The first scroll 116 may be a drive scroll and the second scroll 118 may be a driven scroll, though it will be appreciated that in other instances the first scroll 116 may be the driven scroll and the second scroll 118 may be the drive scroll. In order for the first involute 122 and the second involute 124 to form compression chambers to compress the working fluid (or form expansion chambers to expand the working fluid), the first scroll shaft 112 and the second scroll shaft 114 are axially-parallel to and misaligned or offset from one another. The first scroll shaft 112 and the second scroll shaft 114 also rotate in phase, meaning that the first scroll shaft 112 and the second scroll shaft 114 rotate completely in synchronization (e.g., radially in sync, etc.) with one another (e.g., at the same rotational speed and angular position). In order to aid or ensure that the first scroll shaft 112 and the second scroll shaft 114 are rotating in phase, the scroll device 100 may include a coupling device 120 having a coupling ring 136 and a plurality of connecting members 138 (e.g., fingers, flexures, etc.). The plurality of connecting members 138 includes a plurality of protruding members 140, a plurality of flexure arms 142, each flexure arm 142 extending from corresponding protruding member 140, and a plurality of receivers 144, each receiver 144 extending from a corresponding flexure arm 142 (see, e.g., FIGS. 5-11C etc.). Among other things, the plurality of connecting members 138 enable torque to be transmitted from the first scroll shaft 112 and the second scroll 118 and keep the first scroll shaft 112 and the second scroll 118 in rotational synchronization (e.g., sync, etc.) while maintaining a high degree of parallel misalignment between the first scroll shaft 112 and the second scroll shaft 114, as will be described in detail below.

Figure 3:
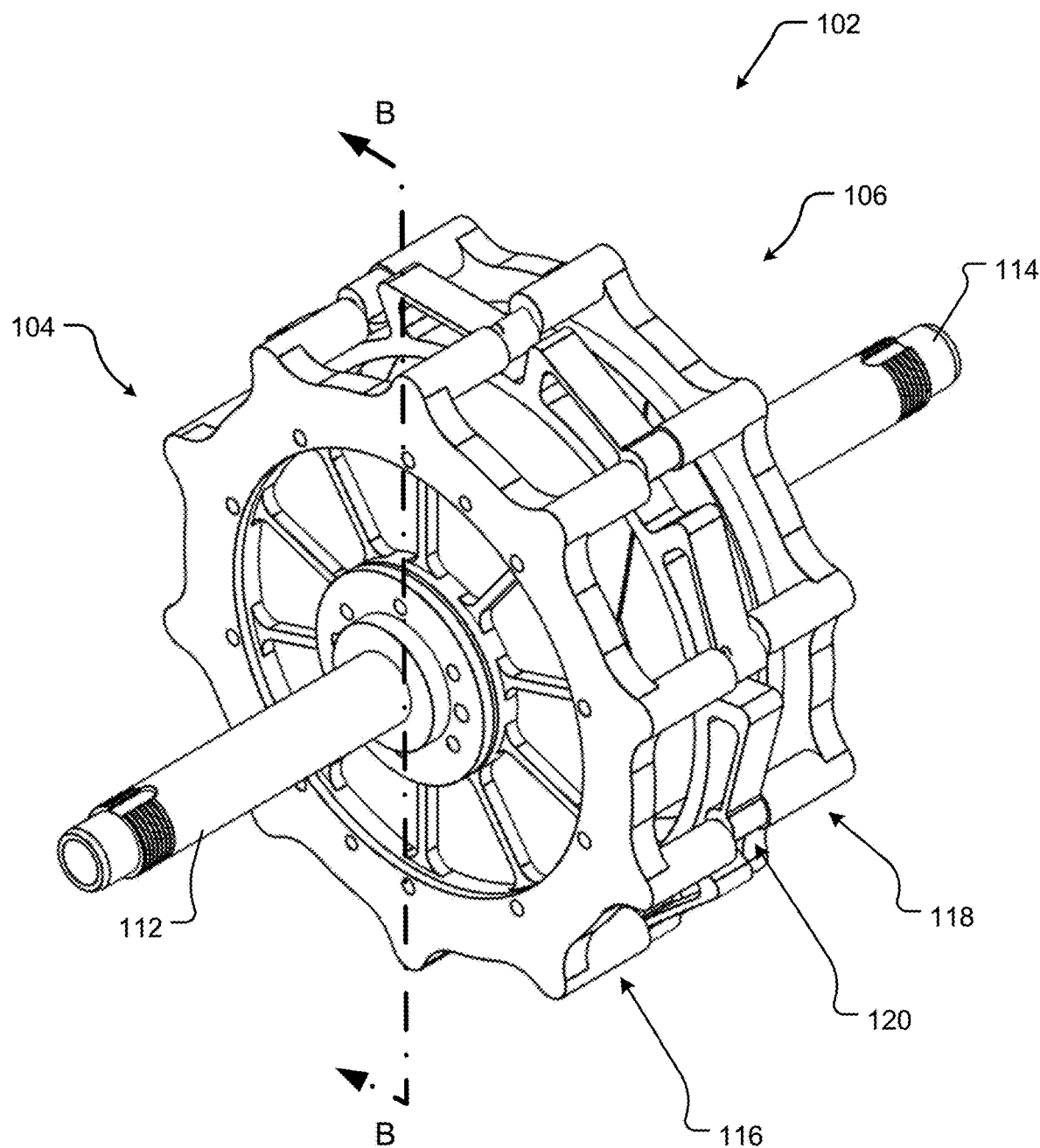
FIG. 3 is a perspective view of a scroll assembly according to at least one embodiment of the present disclosure.
Figure 4:
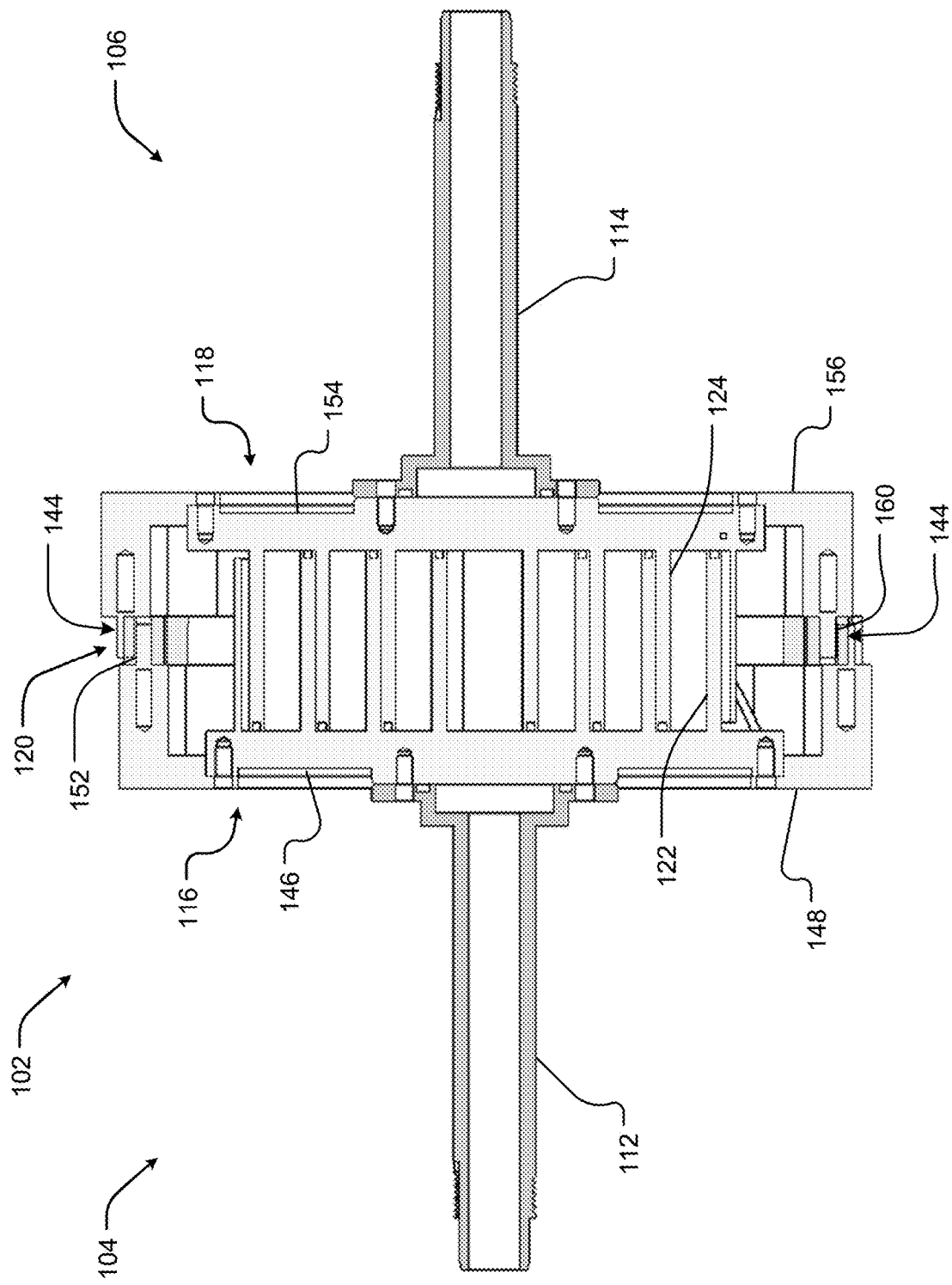
FIG. 4 is a cross-sectional side elevation view of the scroll assembly of FIG. 3 taken along line B-B of FIG. 3 according to at least one embodiment of the present disclosure.
Figure 5:
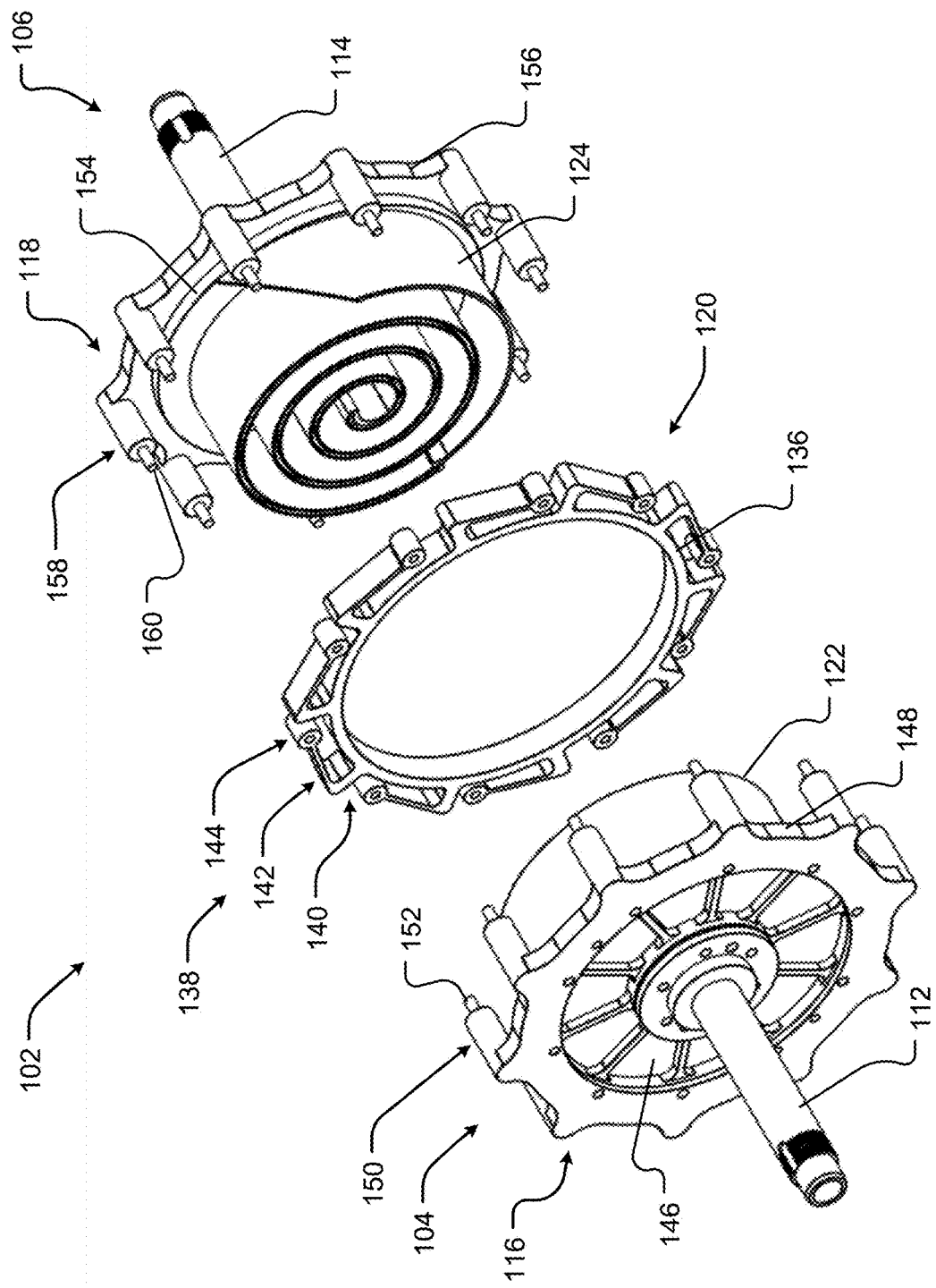
FIG. 5 is a partial exploded perspective view of the scroll assembly of FIG. 3 according to at least one embodiment of the present disclosure.
Figure 6:
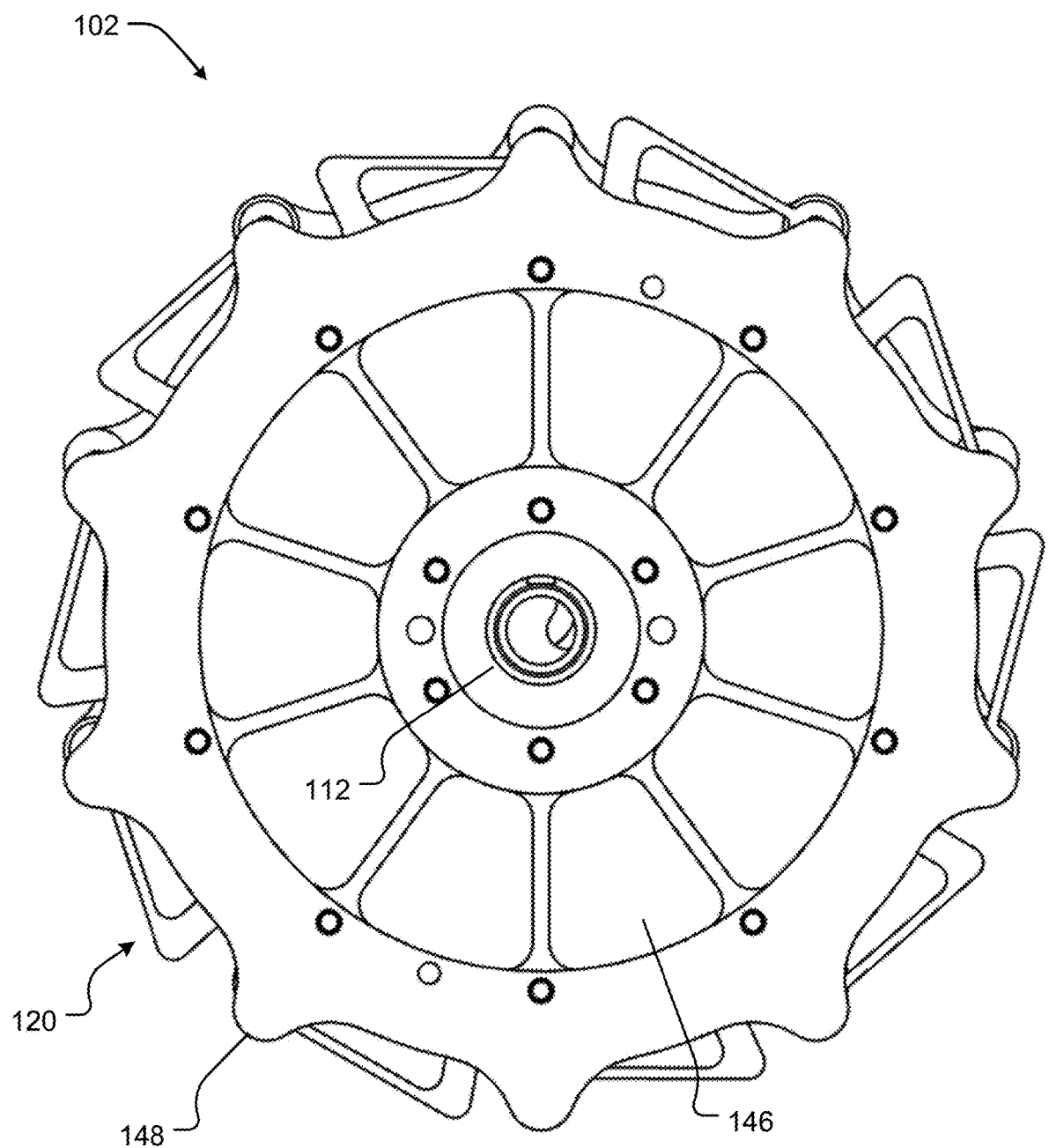
FIG. 6 is a front elevation view of the scroll assembly of FIG. 3 according to at least one embodiment of the present disclosure.

Turning to FIGS. 3-5, a perspective view of the scroll assembly 102, a cross-sectional side elevation view of the scroll assembly 102 taken along line B-B of FIG. 3, and a partially exploded perspective view of the scroll assembly 102 are respectively shown. As illustrated, the scroll assembly 102 includes the coupling device 120 positioned between the first scroll side 104 and the second scroll side 106. More specifically, the first scroll 116 includes a first plate 146 from which the first involute 122 protrudes and a first ring 148 coupled to the first plate 146. In some examples, the first plate 146 and the first ring 148 may be fastened to one another via one or more screws, bolts, pins, or other fasteners. The first scroll shaft 112 is also coupled to the first plate 146. In one example, the first scroll shaft 112 may be fastened to the first plate 146 via one or more screws, bolts, pins, or other fasteners. For example, the first scroll shaft 112 may be attached to the first plate 146 via a flanged interface (e.g., a flange mount, etc.) and fastener arrangement. It will be appreciated that in some embodiments, the first scroll shaft 112, the first plate 146, and/or the first ring 148 may be made as, or formed from, a single, or integral, piece.

The first scroll 116 may be coupled to the coupling device 120 via a first set of connecting members of the plurality of connecting members 138 and the second scroll 118 may be coupled to the coupling device 120 via a second set of connecting members of the plurality of connecting members 138. More specifically, the first ring 148 includes a plurality of first protrusions 150 and a corresponding plurality of first pins 152 extending from the plurality of first protrusions 150. The plurality of first pins 152 are configured to be received by a first set of the plurality of receivers 144A (coupled to or extending from a first set of the plurality of flexure arms 142A) of the coupling device 120. Additionally or alternatively, the plurality of first pins 152 may extend from a first side of the coupling device (e.g., extending from the first set of the plurality of receivers 144A, etc.) in a direction toward the first scroll 116. In this example, the plurality of first protrusions 150 may comprise a plurality of holes that receive a portion of the plurality of first pins 152. In any event, the plurality of first pins 152 may be fit (e.g., press fit, slip fit, etc.) into one or more of the first set of the plurality of receivers 144A of the coupling device 120 and/or the plurality of first protrusions 150 of the first ring 148.

Similarly, the second scroll 118 includes a second plate 154 from which the second involute 124 protrudes and a second ring 156 coupled to the second plate 154. In some examples, the second plate 154 and the second ring 156 may be fastened to one another via one or more screws, bolts, pins, or other fasteners. The second scroll shaft 114 is also coupled to the second plate 154. In one example, the second scroll shaft 114 may be fastened to the second plate 154 via one or more screws, bolts, pins, or other fasteners. By way of example, the second scroll shaft 114 may be attached to the second plate 154 via a flanged interface (e.g., a flange mount, etc.) and fastener arrangement. It will be appreciated that in some embodiments, the second scroll shaft 114, the second plate 154, and/or the second ring 156 may be made as, or formed from, a single, or integral, piece. The second ring 156 also includes a plurality of second protrusions 158 and a corresponding plurality of second pins 160 extending from the plurality of second protrusions 158. The plurality of second pins 160 are configured to be received by a second set of the plurality of receivers 144B (coupled to or extending from a second set of the plurality of flexure arms 142B) of the coupling device 120. Additionally or alternatively, the plurality of second pins 160 may extend from a second side of the coupling device (e.g., extending from the second set of the plurality of receivers 144B, etc.) in a direction toward the second scroll 118. In this example, the plurality of second protrusions 158 may comprise a plurality of holes that receive a portion of the plurality of second pins 160. In any event, the plurality of second pins 160 may be fit (e.g., press fit, slip fit, etc.) into one or more of the second set of the plurality of receivers 144B of the coupling device 120 and/or the plurality of second protrusions 158 of the second ring 156. It will be appreciated that in other embodiments, the plurality of first pins 152 and/or the plurality of second pins 160 may be bolts, screws, or the like.

Figure 7:
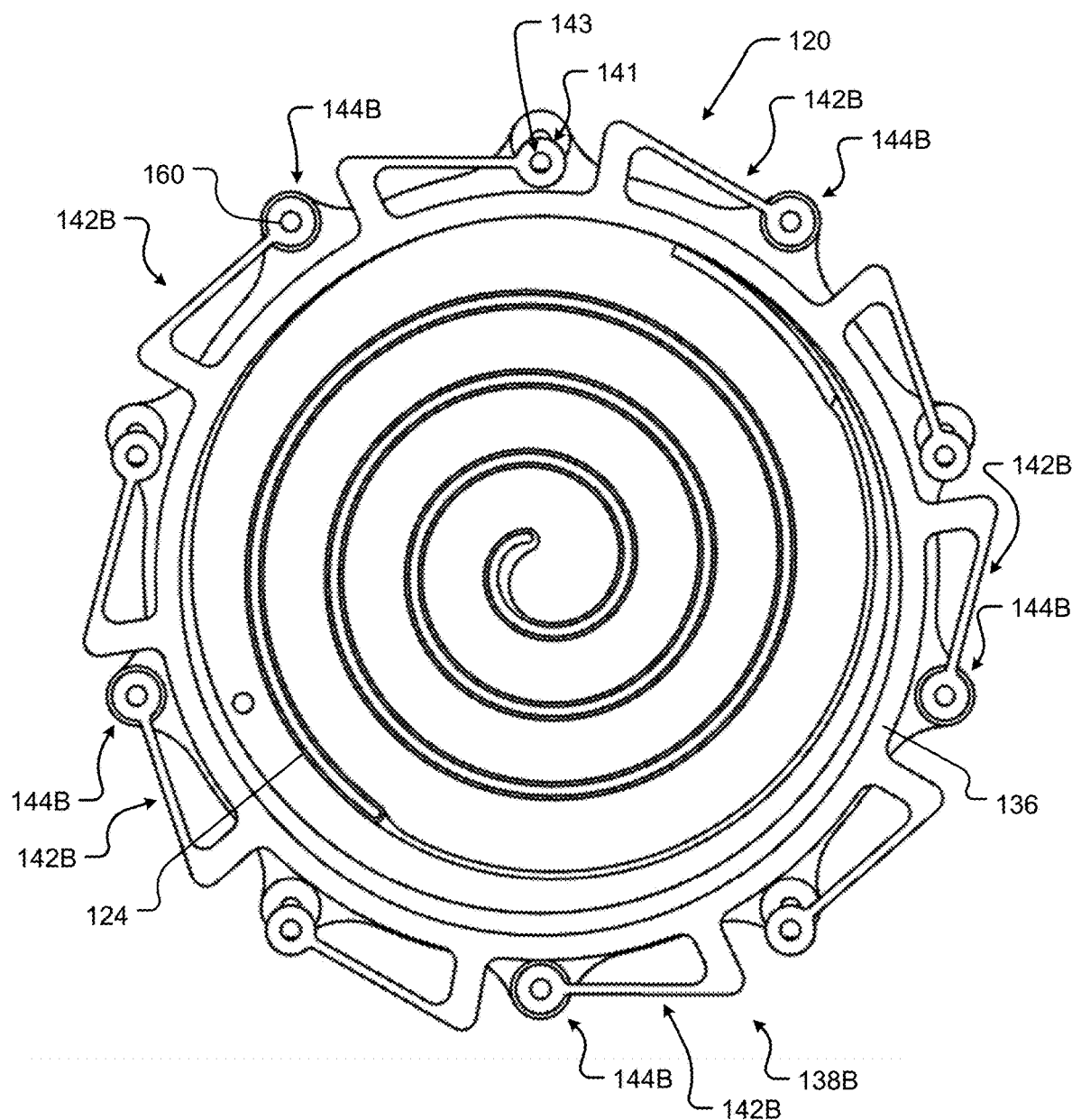
FIG. 7 is a front elevation view of the scroll assembly of FIG. 3 with a first scroll side removed according to at least one embodiment of the present disclosure.
Figure 8:
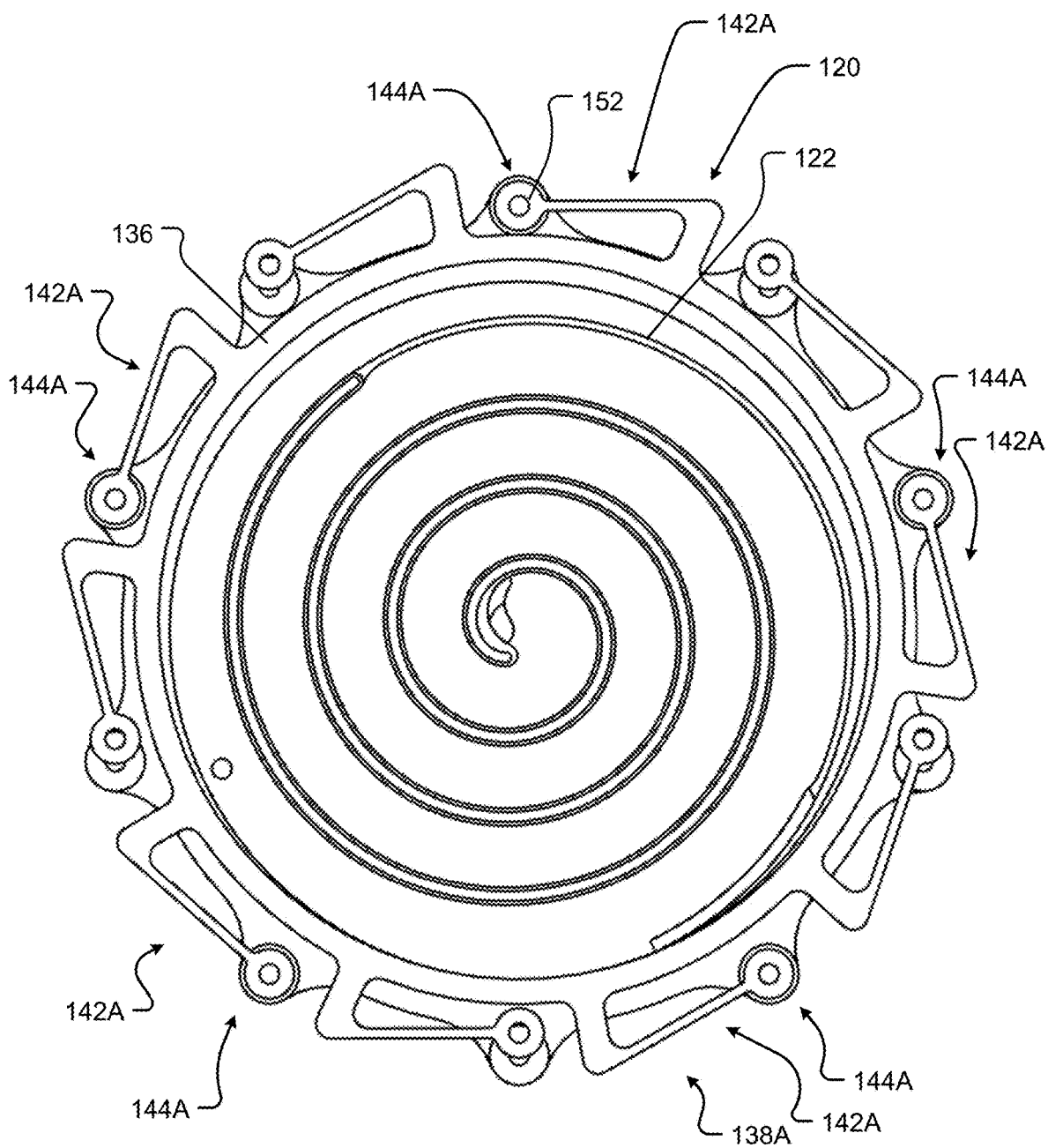
FIG. 8 is a rear elevation view of the scroll assembly of FIG. 3 with a second scroll side removed according to at least one embodiment of the present disclosure.

Turning to FIGS. 7 and 8, a front elevation view of the scroll assembly 102 with the first scroll side 104 removed and a rear elevation view of the scroll assembly 102 with the second scroll side 106 removed are respectively shown. As shown, the first set of a plurality of receivers 144A and the second set of the plurality of receivers 144B are alternating such that the plurality of first pins 152 and the plurality of second pins 160 are also alternating. In other words, the first set of the plurality of flexure arms 142A may be arranged (e.g., radially) such that every other first flexure arm 142A around the periphery of the coupling ring 136 is attached to the first scroll 116 (e.g., the drive scroll) while the second set of the plurality of flexure arms 142B between every other first flexure arm 142A around the periphery of the coupling ring 136 is attached to the second scroll 118 (e.g., the driven scroll). As will be described in more detail below, by arranging the first set of a plurality of receivers 144A and the second set of the plurality of receivers 144B to alternate between each other, the forces transmitted axially to the first set of the plurality of flexure arms 142A of the first set of a plurality of receivers 144A coupled to the first scroll 116 (e.g., the drive scroll) are configured to drive the second scroll 118 (e.g., via the second set of the plurality of flexure arms 142B of the driven scroll, etc.). The ability for the first set of the plurality of flexure arms 142A and the second set of the plurality of flexure arms 142B to bend throughout one revolution provides enough flex to accommodate the distance that the parallel misaligned first scroll shaft and second scroll shaft are offset. In such example arrangement, an even number of first pins 152 and/or second pins 160 (which may be the same pins) may be used to evenly connect to both the first scroll 116 and the second scroll 118. The first pins 152 are trued for the first scroll 116 and the second pins 160 are offset by one for the second scroll 118.

Figure 9:
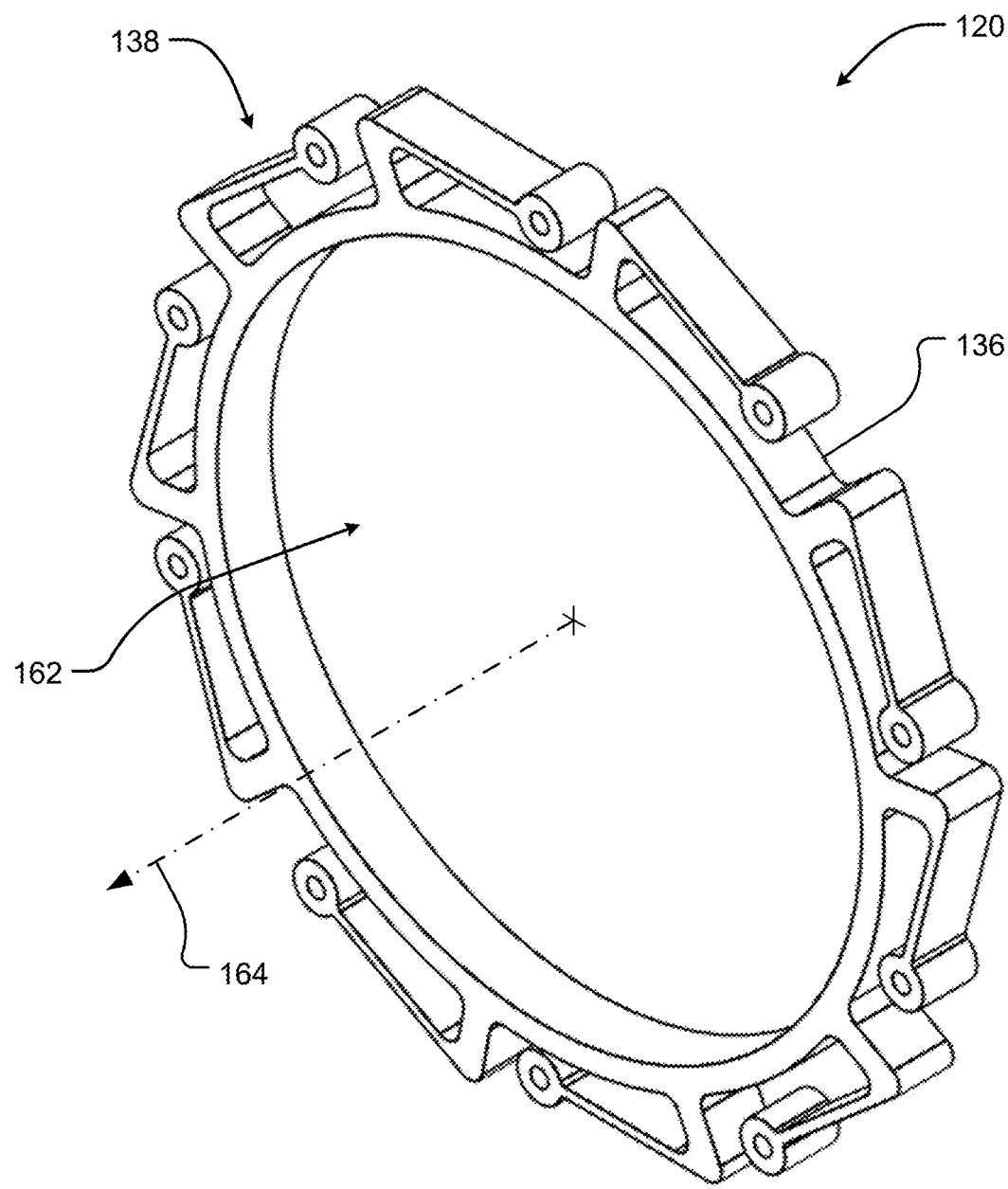
FIG. 9 is a perspective view of a coupling device according to at least one embodiment of the present disclosure.
Figure 10:
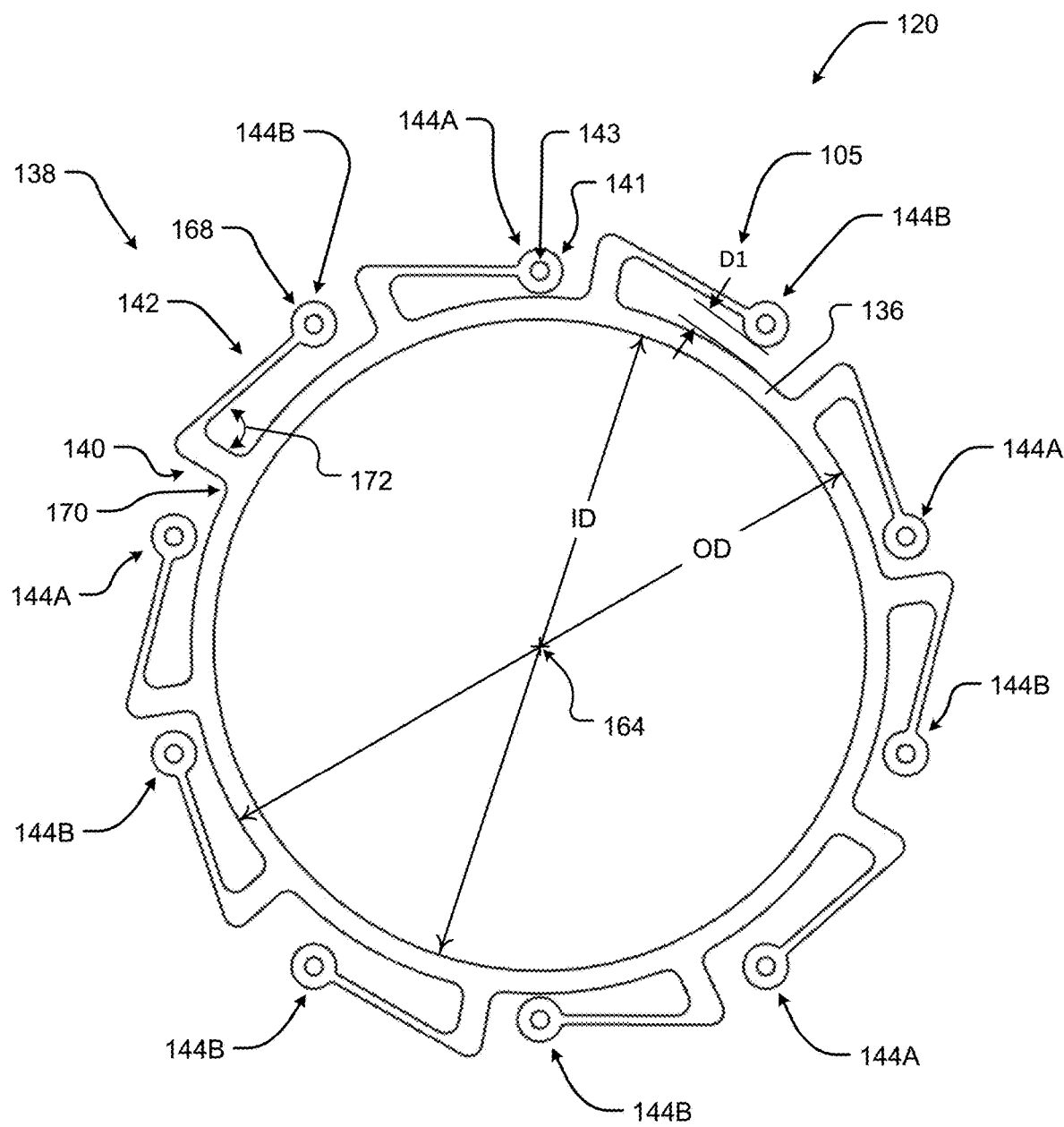
FIG. 10 is a front elevation view of the coupling device of FIG. 9 according to at least one embodiment of the present disclosure.

Turning to FIGS. 9 and 10, a perspective view and a front elevation view of the coupling device 120 is shown. The coupling device 120 is configured to couple the first scroll 116 (e.g., a drive scroll) and the second scroll 118 (e.g., a driven scroll) where the first scroll shaft 112 and the second scroll shaft 114 are parallel to, and misaligned (e.g., offset a distance between respective axes) from, one another. The coupling device 120 advantageously does not require use of oil or grease lubrication and can thus be used with oil-free scroll compressors, vacuum pumps, or expanders. In some examples, the coupling device 120 may be formed as an extruded part, a wire electrical discharge machined part, a three-dimensional printed part, and/or the like. Since the coupling device 120 may comprise a two-dimensional cross-section that has been formed to have a certain thickness (e.g., extending along the axial direction), the coupling device 120 can provide an economically produced part having a construction with a minimal overall thickness and minimal mass of material used. Among other things, this construction can save on machining and material costs, provide an environmentally friendly alternative to existing couplings (e.g., by using less material, producing less waste, etc.), and produce a slim interface between co-rotating scrolls 116, 118 (e.g., reducing the overall axial dimension of the scroll device 100, etc.). At least some benefits of the arrangements described herein include, but are in no way limited to, providing a maintenance free scroll device 100 (e.g., that does not requires any exchange or replenishment of lubrication fluid), a scroll device 100 that includes fewer parts than conventional scroll devices (e.g., that no additional motors or complicated couplings required), a coupling device 120 that is capable of flexing within predetermined elastic limits for continuous reliable operation over millions of cycles, a smaller overall footprint for the scroll device 100, and an economical and environmentally friendly alternative to conventional scroll device construction, to name a few.

As previously described, the coupling device 120 includes the coupling ring 136 having an opening 162. The coupling ring 136 includes an inner diameter, ID, and an outer diameter, OD, that defines a periphery of the coupling ring 136. The coupling device 120 also includes the plurality of connecting members 138 extending from the outer diameter, OD, of the coupling ring 136. The plurality of connecting members 138 allow for torque to be transmitted between the first scroll 116 and the second scroll 118 and keep the first scroll 116 and the second scroll 118 in synchronization (e.g., radially in sync, etc.) while also enabling a high degree of parallel misalignment (e.g., axial offset distance, etc.) between the first scroll shaft 112 and the second scroll shaft 114. Thus, the coupling device 120 maintains a controlled parallel misalignment between the first scroll shaft 112 and the second scroll shaft 114 (e.g., enabling an eccentric rotation of the first scroll 116 and the second scroll 118 about a respective axis such that the first scroll 116 and the second scroll 118 are synchronized with one another).

The plurality of connecting members 138 as shown each include the protruding member 140 extending from the coupling ring 136, the flexure arm 142 extending at an angle from the protruding member 140, and the receiver 144 positioned at an end of the flexure arm 142. More specifically, the protruding members 140 protrude radially outward in a direction away from a center axis 164 of the coupling ring 136. The protruding members 140 may be arranged at points 170 around the periphery of the coupling ring 136. In some cases, these points 170 may be disposed circumferentially equidistant from one another around the periphery of the coupling ring 136.

The flexure arm 142 may extend from the protruding member 140 at a nonzero angle from a radially outermost end of the body to a flexure point end 168 (which in some embodiments, may be the same as the receiver 144). Stated differently, an angle 172 between the protruding member 140 and the flexure arm 142 may be nonzero (e.g., an acute, a right, or an obtuse angle). In at least one example, the flexure arm 142 may extend from the protruding member 140 in a circumferential, or a circumferentially tangent, direction. In some examples, the flexure arm 142 may extend from the protruding member 140 such that the flexure point end 168 is offset from the protruding member 140 by a distance running along a line that is perpendicular to the protruding member 140. The flexure arm 142 is configured to elastically move between a first flexed position and a second flexed position. In the first flexed position, the flexure end point 168 is arranged a first distance D1 105 (shown in FIG. 10) from the outer diameter of the coupling ring 136 and in the second flexed position, the flexure end point 168 is arranged a second distance D2 107 (shown in FIG. 11B) from the outer diameter of the coupling ring 136. In such embodiments, the second distance D2 107 is greater than the first distance D1 105. The flexure arm 142 may comprise an unflexed position between the first flexed position and the second flexed position. In one example, the unflexed position may correspond to a default, or as machined, state for the flexure arm 142.

In some embodiments, the flexure arms 142 may be attached to the first scroll 116 and the second scroll 118 by the plurality of first pins 152 and the plurality of second pins 160 via the plurality of receivers 144. The receivers 144 may form a ring 141 with an aperture 143 configured to receive a pin of the plurality of first pins 152 or the plurality of second pins 160. In other embodiments the receiver 144 may be any shape or size that can be coupled with or attached to the first scroll 116 or the second scroll 118. It will be appreciated that in some embodiments, the plurality of connecting members 138 may not include the receiver 144. For example, in other embodiments, the flexure arms 142 may be attached to the first scroll 116 and the second scroll 118 by bolted connections that protrude from an outer diameter of the first scroll 116 and the second scroll 118. In some instances, the flexure arms 142 may comprise pins that extend into corresponding holes arranged in an outer diameter portion of the first scroll 116 and the second scroll 118. The coupling device 120 may be made from metal, plastic, carbon fiber, composite materials, and/or any combination thereof. In some examples, the coupling device 120 may be made from titanium, nickel-titanium alloy (e.g., NiTiNOL, etc.), stainless steel, or other metal and/or alloy.

Figure 11A:
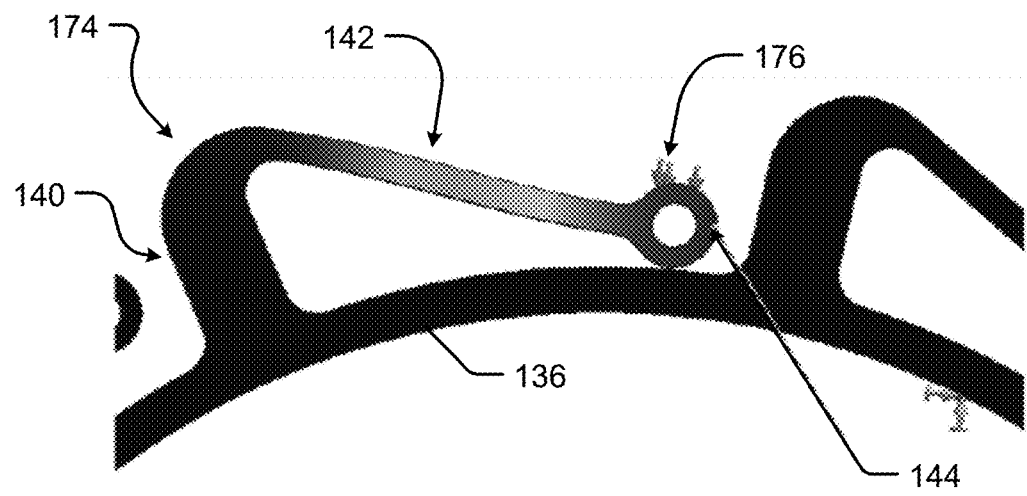
FIG. 11A is a front detailed view of a connecting member in a first position according to at least one embodiment of the present disclosure.
Figure 11B:
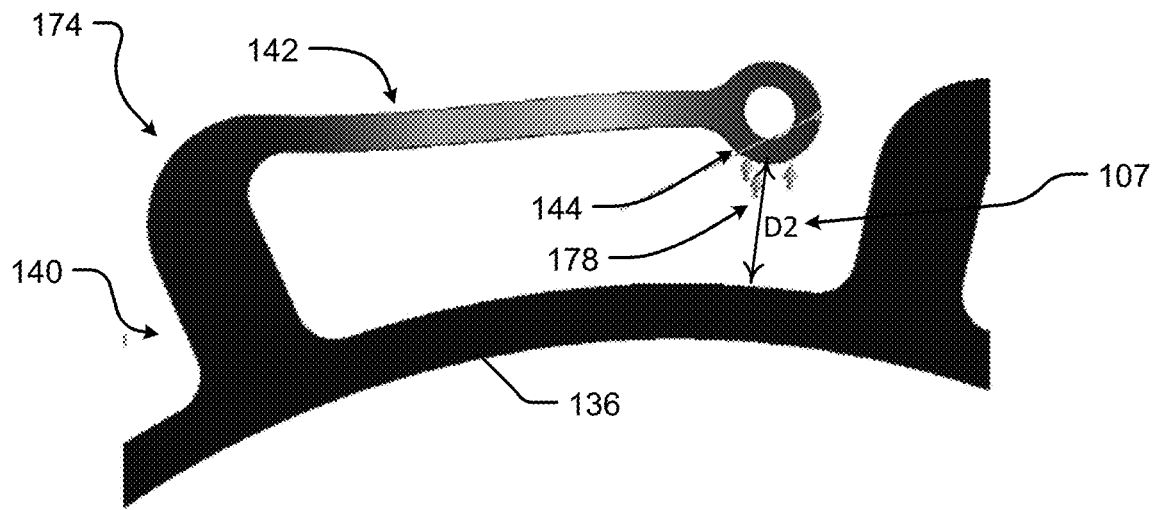
FIG. 11B is a front detailed view of a connecting member in a second position according to at least one embodiment of the present disclosure.
Figure 11C:
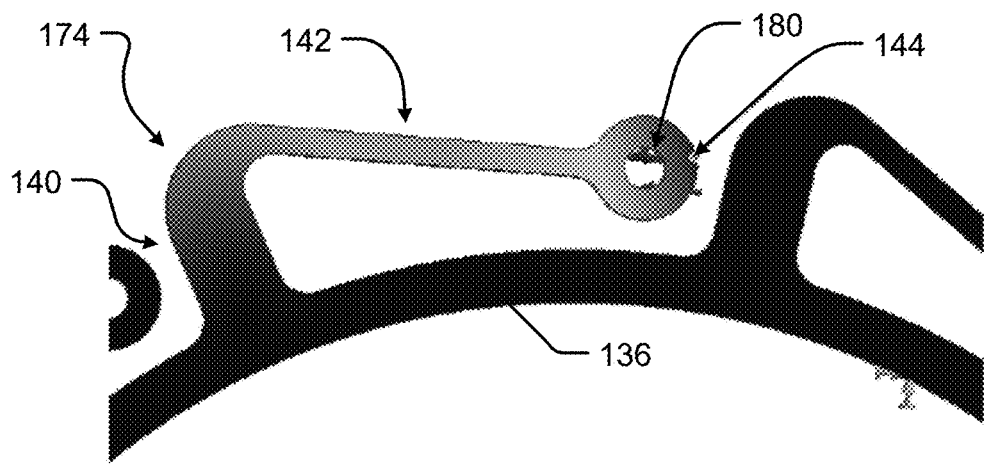
FIG. 11C is a front detailed view of a connecting member in a third position according to at least one embodiment of the present disclosure.

Turning to FIGS. 11A-11C, a front detailed view of the connecting member 138 in a first position, a second position, and a third position are respectively shown. More specifically, FIGS. 11A-11C illustrate a stress analysis of the connecting member 138 undergoing a transverse deflection at a 12 o-clock position 176, a transverse deflection at a 6 o-clock position 178, and an axial deflection at a 9 and a 3 o-clock position 180, respectively. As shown, the plurality of flexure arms 142 may be configured to elastically flex, or rotate, about a joint or hinge point 174 adjacent the radially outermost end of the protruding member 140. The joint or hinge point 174 may correspond to a hinge that is integrally formed in the coupling ring 136 between the protruding member 140 and the flexure arm 142. In any event, the plurality of flexure arms 142 are able to handle or receive more force axially (e.g., along a line running from the end of the flexure arm 142 toward the protruding member 140) than transversely (e.g., along a line running from the end of the flexure arm 142 toward the center axis 164 of the coupling ring 136, etc.). More specifically, the flexure arms 142 can flex easily in the transverse direction (e.g., along a line running from the end of the flexure arm 142 toward the center axis 164 of the coupling ring 136, etc.) to accommodate the parallel misalignment (e.g., axial offset distance, etc.) of the first scroll shaft 112 and the second scroll shaft 114 throughout a revolution of the first scroll shaft 112 and the second scroll shaft 114. The flexure arms 142 are also rigid or substantially rigid in the longitudinal or axial direction (e.g., along a line running from the end of the flexure arm 142 toward the protruding member 140), which creates or results in a force vector that drives the second scroll 118 (e.g., the driven scroll).

The coupling ring 136 of the coupling device 120 may be manufactured from a material having a high fatigue resistance such as, for example, metal, plastic, polyoxymethylene, acetal, polyacetal, and/or polyformaldehyde (e.g., Dupont brand Delrin® plastic, etc.), titanium, titanium alloys, steel, steel alloys, and/or combinations thereof. In other embodiments, the coupling ring 136 may be formed from any solid, rigid material. During operation, each flexure arm 142 may go through one cycle of bending per revolution, which means that the plurality of flexure arms 142 is formed from a material that is capable of withstanding millions of cycles. In at least one embodiment, a material with a material endurance limit would be selected and the bending stress on each flexure arm 142 would be less than the maximum stress to reach such endurance limit. It will be appreciated that the coupling ring 136 and the plurality of connecting members 138 (and any portion of the connecting member 138 such as the protruding member 140, the flexure arm 142, and/or the receiver 144) may be formed from different materials. In some examples, the coupling ring 136 and the plurality of connecting members 138 may be integrally formed from the same material. The coupling ring 136 and the plurality of connecting members 138 may be molded, printed (e.g., via three-dimensional printing, selective laser sintering, fused deposition modelling, laminated object manufacturing, etc.), extruded, conventionally machined, machined using wire electrical discharge machining (EDM), etc., and/or combinations thereof.

The coupling device 120 as described above beneficially enables the first scroll shaft 112 of the first scroll 116 and the second scroll shaft 114 of the second scroll 118 to be parallel and misaligned (e.g., axially offset a distance, etc.) from one another keeping the first scroll 116 and the second scroll 118 in synchronization (e.g., in rotational or radial sync, etc.). More specifically, the plurality of connecting members 138 allow torque to be efficiently transmitted between the first scroll 116 and the second scroll 118. Additionally, use of the coupling device 120 reduces the number of components of the scroll device 100 as, for example, one motor can be used without the use of belts or gears. Further, the coupling device 120 advantageously does not use oil or grease lubrication and can thus be used with oil-free scroll compressors, vacuum pumps, or expanders.

A number of variations and modifications of the foregoing disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed:

1. A flexible coupling device for a co-rotating scroll device, comprising:
a coupling ring comprising an inner diameter and an outer diameter, the outer diameter defining a periphery of the coupling ring; and
a plurality of connecting members interconnected to the outer diameter of the coupling ring, the plurality of connecting members each having a protruding member extending radially outward from the periphery of the coupling ring in a direction away from a center of the coupling ring,
wherein each protruding member extends from a connection point at the outer diameter of the coupling ring to a hinge point offset from the outer diameter of the coupling ring,
wherein each connecting member of the plurality of connecting members comprises a flexure arm interconnected to the protruding member at the hinge point and extending from the hinge point, at a nonzero angle, to a flexure end point, wherein the flexure arm is configured to elastically move between a first flexed position and a second flexed position, wherein, in the first flexed position, the flexure end point is arranged a first distance from the outer diameter of the coupling ring, wherein, in the second flexed position, the flexure end point is arranged a second distance from the outer diameter of the coupling ring, and wherein the second distance is greater than the first distance,
wherein each connecting member of the plurality of connecting members comprises a receiver extending from the flexure arm, the receiver configured to receive a pin of at least one of a first scroll or a second scroll of the co-rotating scroll device, the first scroll having a first ring coupled to a first plate, the second scroll having a second ring coupled to a second plate, the pin extending from a corresponding protrusion of at least one of the first ring of the first scroll or the second ring of the second scroll.

2. The flexible coupling device of claim 1, wherein the plurality of connecting members are arranged circumferentially equidistant from one another around the periphery of the coupling ring.

3. The flexible coupling device of claim 2, wherein a first set of connecting members of the plurality of connecting members is configured to interconnect with a first scroll of the co-rotating scroll device, and wherein a second set of connecting members of the plurality of connecting members is configured to interconnect with a second scroll of the co-rotating scroll device.

4. The flexible coupling device of claim 3, wherein the first set of connecting members comprises every other connecting member of the plurality of connecting members around the periphery of the coupling ring, and wherein the second set of connecting members comprises connecting members of the plurality of connecting members disposed between adjacent connecting members of the first set of connecting members around the periphery of the coupling ring.

5. The flexible coupling device of claim 1, wherein the receiver comprises a ring and an aperture to receive the pin of at least one of the first scroll or the second scroll of the co-rotating scroll device.

6. The flexible coupling device of claim 1, wherein the coupling ring and the plurality of connecting members are formed from a same material.

7. The flexible coupling device of claim 1, wherein the coupling ring and the plurality of connecting members are formed from different materials.

8. A co-rotating scroll device comprising:
a first scroll having a first plate, a first involute extending from the first plate, a first scroll shaft connected to the first plate, a first ring coupled to the first plate, a plurality of first protrusions extending from the first ring, and a plurality of first pins extending from the plurality of first protrusions;
a second scroll having a second plate, a second involute extending from the second plate, a second scroll shaft connected to the first plate, a second ring coupled to the second plate, a plurality of second protrusions extending from the second ring and a plurality of second pins extending from the plurality of second protrusions, wherein the first involute and the second involute are nested and wherein the first scroll shaft and the second scroll shaft are parallel and misaligned; and
a coupling device configured to couple the first scroll and the second scroll and comprising a coupling ring and a plurality of connecting members extending from the coupling ring,
wherein each connecting member of the plurality of connecting members comprises a flexure arm interconnected to a protruding member at a hinge point offset from an outer diameter of the coupling ring and extending from the hinge point, at a nonzero angle, to a flexure end point,
wherein each connecting member of the plurality of connecting members comprises a receiver extending from the flexure arm, the receiver configured to receive at least one of a first pin of at least one of the plurality of first pins or a second pin of the plurality of second pins.

9. The co-rotating scroll device of claim 8, wherein a first set of connecting members of the plurality of connecting members is configured to interconnect with the first scroll of the co-rotating scroll device, and wherein a second set of connecting members of the plurality of connecting members is configured to interconnect with the second scroll of the co-rotating scroll device.

10. The co-rotating scroll device of claim 9, wherein the first set of connecting members comprises every other connecting member of the plurality of connecting members around a periphery of the coupling ring, and wherein the second set of connecting members comprises connecting members of the plurality of connecting members disposed between adjacent connecting members of the first set of connecting members around the periphery of the coupling ring.

11. The co-rotating scroll device of claim 8, further comprising a motor configured to drive the first scroll, wherein the second scroll is driven by the first scroll via the coupling device.

12. The co-rotating scroll device of claim 8, wherein the plurality of connecting members each have a protruding member extending radially outward from the coupling ring in a direction away from a center of the coupling ring.

13. The co-rotating scroll device of claim 12, wherein each protruding member extends from a connection point of the coupling ring to the hinge point offset from the outer diameter of the coupling ring.

14. The co-rotating scroll device of claim 13, wherein the flexure arm is configured to elastically move between a first flexed position and a second flexed position, wherein, in the first flexed position, the flexure end point is arranged a first distance from the outer diameter of the coupling ring, wherein, in the second flexed position, the flexure end point is arranged a second distance from the outer diameter of the coupling ring, and wherein the second distance is greater than the first distance.

15. The co-rotating scroll device of claim 8, wherein the receiver comprises a ring and an aperture to receive at least one of the first pin of the plurality of first pins of the first scroll or the second pin of the plurality of second pins of the second scroll.

16. The co-rotating scroll device of claim 8, wherein the coupling ring and the plurality of connecting members are formed from a same material.

17. The co-rotating scroll device of claim 8, wherein the coupling ring and the plurality of connecting members are formed from different materials.

18. A co-rotating scroll device comprising:
   a first scroll having a first plate, a first involute extending from the first plate, a first scroll shaft connected to the first plate, a first ring coupled to the first plate, a plurality of first protrusions extending from the first ring, and a plurality of first pins extending from the plurality of first protrusions;
   a second scroll having a second plate, a second involute extending from the second plate, a second scroll shaft connected to the first plate, a second ring coupled to the second plate, a plurality of second protrusions extending from the second ring and a plurality of second pins extending from the plurality of second protrusions, wherein the first involute and the second involute are nested and wherein the first scroll shaft and the second scroll shaft are parallel and misaligned; and
   a coupling device configured to couple the first scroll and the second scroll, the coupling device comprising:
      a coupling ring comprising an inner diameter and an outer diameter, the outer diameter defining a periphery of the coupling ring; and
      a plurality of connecting members interconnected to the outer diameter of the coupling ring, the plurality of connecting members each having a protruding member extending radially outward from the periphery of the coupling ring in a direction away from a center of the coupling ring,
      wherein each protruding member extends from a connection point at the outer diameter of the coupling ring to a hinge point offset from the outer diameter of the coupling ring,
      wherein each connecting member of the plurality of connecting members comprises a flexure arm interconnected to the protruding member at the hinge point and extending from the hinge point, at a nonzero angle, to a flexure end point, wherein the flexure arm is configured to elastically move between a first flexed position and a second flexed position, wherein, in the first flexed position, the flexure end point is arranged a first distance from the outer diameter of the coupling ring, wherein, in the second flexed position, the flexure end point is arranged a second distance from the outer diameter of the coupling ring, and wherein the second distance is greater than the first distance,
      wherein each connecting member of the plurality of connecting members comprises a receiver extending from the flexure arm, the receiver configured to receive at least one of a first pin of the plurality of first pins or a second pin of the plurality of second pins.

19. The flexible coupling device of claim 18, wherein the plurality of connecting members are arranged circumferentially equidistant from one another around the periphery of the coupling ring.

20. The co-rotating scroll device of claim 18, wherein the receiver comprises a ring and an aperture to receive at least one of the first pin of the plurality of first pins or the second pin of the plurality of second pins.

\* \* \* \* \*